United States Patent [19]

Brown

[11] Patent Number: 4,753,034
[45] Date of Patent: Jun. 28, 1988

[54] ANTI-FROST FAN

[76] Inventor: Philip Brown, 4689 - 8 Mile Rd., NW., Conklin, Mich. 49403

[21] Appl. No.: 52,204

[22] Filed: May 19, 1987

Related U.S. Application Data

[63] Continuation of Ser. No. 820,654, Jan. 21, 1986, abandoned.

[51] Int. Cl.4 ............................................. A01G 13/00
[52] U.S. Cl. ......................................................... 47/2
[58] Field of Search ..................... 47/2; 416/187, 178; 414/608, 607

[56] References Cited

U.S. PATENT DOCUMENTS

| | | | |
|---|---|---|---|
| 1,165,931 | 12/1915 | Akimoff | 416/178 |
| 1,568,946 | 1/1926 | Generich | 416/178 |
| 2,165,148 | 7/1939 | Nelson et al. | 47/2 |
| 2,980,990 | 4/1961 | Sprouse | 416/178 |
| 3,656,643 | 4/1972 | Keneson et al. | 414/608 |
| 3,847,505 | 11/1974 | Tresse | 416/178 |
| 4,501,089 | 2/1985 | Cobden | 47/2 |

Primary Examiner—Robert A. Hafer
Assistant Examiner—Bradley M. Lewis
Attorney, Agent, or Firm—Glenn B. Morse

[57] ABSTRACT

A vertical-axis centrifugal fan is operated in an orchard or crop area to draw warm upper air downward, and urge it laterally outward to displace lower strata of cold air to prevent freezing. The rotor is axially open on top, and closed on the bottom to establish this flow without ducting.

2 Claims, 2 Drawing Sheets

ANTI-FROST FAN

This application is a continuation of Ser. No. 820,650, filed Jan. 21, 1986, now abandoned.

BACKGROUND OF THE INVENTION

Orchard and other crops are subject to the danger of freezing in both spring and fall. In the spring, a late frost can ruin the buds; and in the fall, the mature fruit is damaged. Elaborate attempts have been made to prevent frost damage, including the use of smoke generators, heaters, and varieties of fans oriented to generate turbulence and keep the air moving. Stagnation of cold air seems to be the problem, as the heavier colder layers accumulate in most spots to a depth that can submerge orchard trees. Fans, and even helicopters, have been used to induce downward movement of the warmer upper air to displace and warm the lower air. These procedures have not been fully effective, as is indicated by the general availability of rather expensive frost insurance. The cost of this, or the alternate possibility of the loss from crop damage, establishes that equipment of substantial cost is justified if it is effective.

SUMMARY OF THE INVENTION

A centrifugal fan is positioned to draw air downward, and force it laterally outward near the ground in an orchard or other crop area. The fan has a rotor positioned on a vertical axis, the top of the rotor being open, and the bottom closed.

DESCRIPTION OF THE DRAWINGS

FIG. 4 is a sectional view on an enlarged scale showing the structure of the vanes of the rotor.

DESCRIPTION OF THE PREFERRED EMBODIMENT

Figure 1:
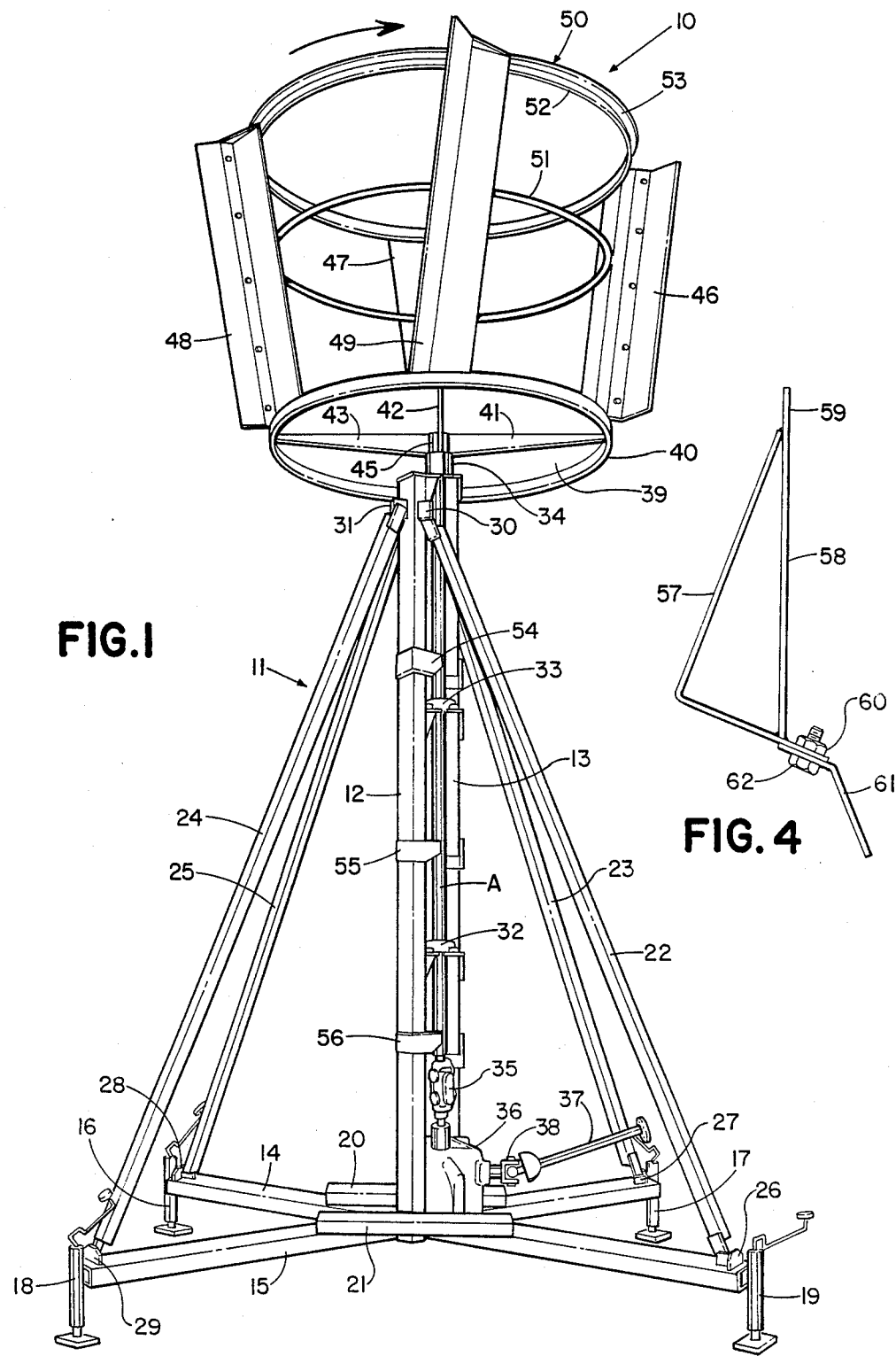
FIG. 1 is a perspective view showing a machine embodying the present invention in the operating position.

Referring to FIG. 1, the illustrated machine has a rotor generally indicated at 10 mounted for rotation on a vertical axis on top of the mast structure indicated at 11. This structure includes the parallel vertical columns 12 and 13 welded to the X-shaped base structure formed by the intersecting beams 14 and 15. As a practical matter, one of these two beams will probably be made of two sections, and welded at the center to form the effect of a continuous beam. The vertically-adjustable supports 16 and 17, together with the screw jack units 18 and 19 will accommodate the mast structure to practically any degree of unevenness of the ground on which it stands. The short square tubes 20 and 21 are welded at the intersection of the beams 14 and 15 to provide receptacles for the entrance of a fork-lift to facilitate the transportation of the machine from one place to another. Diagonals as shown at 22-25 extend from the outer extremities of the base to points near the top of the mast structure to stablize the machine against cross winds and any vibration that may be involved. It is preferable that the diagonals be detachable, and they are secured at their opposite ends by bolts or other fastenings to the brackets 26-31. If desired, the beams 14 and 15 may be constructed as telescoping members to further reduce the overall dimensions of the unit for transportation.

The vertical shaft A is carried by the bearings 32-34 mounted on the mast structure, and extends from the coupling 35 connecting it with the angle-drive speed reducing gear box 36 mounted on the base of the machine. A power takeoff shaft 37 is connected to the angle-drive unit by the universal joint 38. The power takeoff shaft 37 is normally connected to a conventional farm tractor to provide the power for operating the machine.

Figure 2:
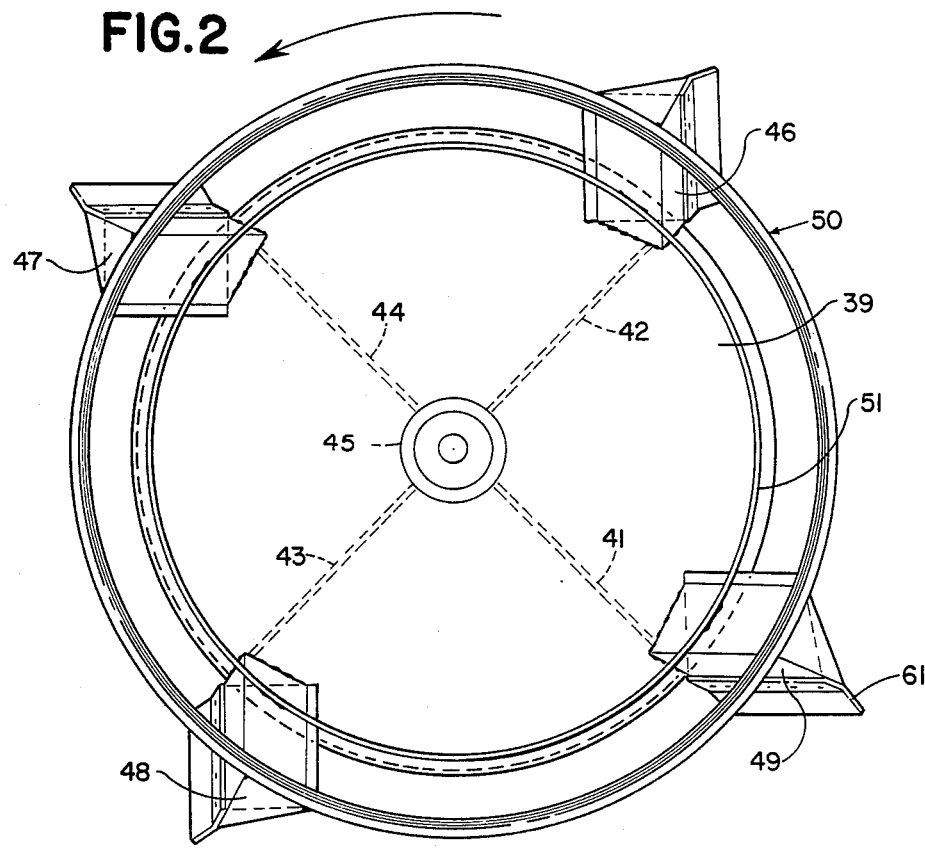
FIG. 2 is a top view of the rotor of the machine shown in FIG. 1.
Figure 3:
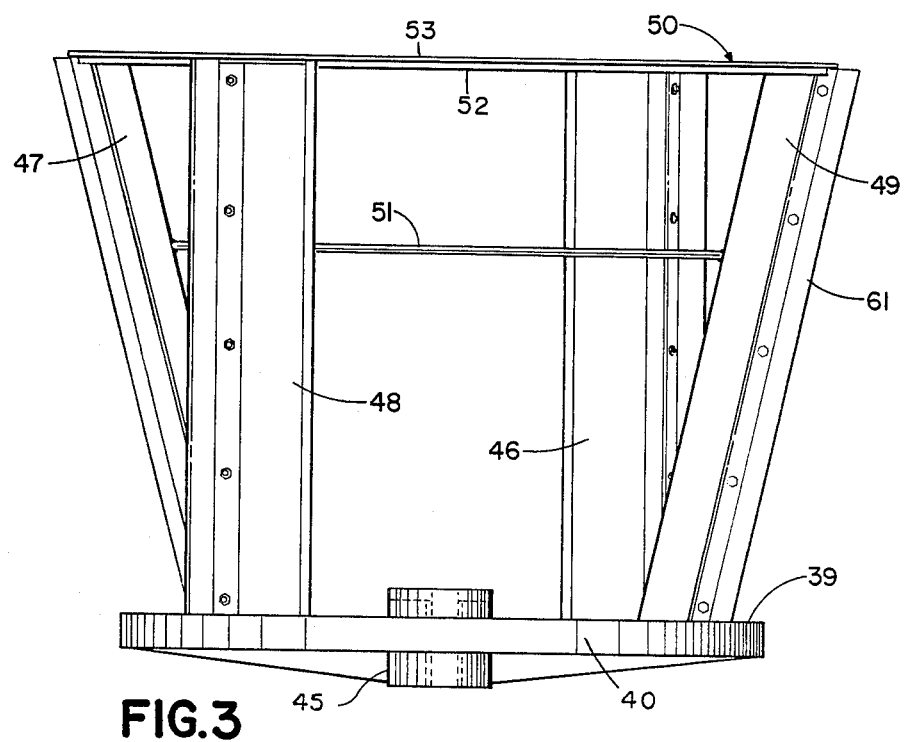
FIG. 3 is a side elevation of the rotor.

The rotor 10 is shown in detail in FIGS. 2, 3, and 4. A circular bottom plate 39 has a peripheral stiffening flange 40 and the radial braces 41-44 extending from the hub 45 outward to the peripheral flange. The hub 45 is detachably secured to the end of the shaft 31 by any conventional means such as a cross-pin (not shown). The vanes 46-49 are welded to the plate 39 at an outwardly-inclined angle of approximately twelve degrees with respect to the axis of the shaft 31. The rotation of the rotor is clock-wise, as viewed from below, and a close look at FIG. 1 wil disclose that the vanes are also inclined in a tangential plane so that the upper ends of the rotors are slightly in advance of the lower ends. The exact amount of this advance is not critical, and it has been found that the vane angle of inclination to an axial plane is preferably approximately five degrees to produce an effective amount of advance of the top of the vanes with respect to the lower ends. The position of these vanes is stabilized by the rings 50 and 51. The top ring 50 is angular in cross-section, so that the vertical flange 52 can be secured to the inside surface of the vanes, and the horizontal flange 53 to the top of the vanes. The components of the rotor are preferably welded together. A series of steps as shown at 54-56 is secured to the mast element 12 to facilitate service and lubrication of the bearings.

The structure of the vanes is best shown in FIG. 4. An angular piece of sheet metal indicated at 57 and having a first leg and a second or lower leg is welded to a flat plate 58 to form a triangular cross-section. The flat plane extends somewhat beyond its junction with the angular plate 57 as shown at 59, and the lower leg of the angular member 57 (as shown in FIG. 4) extends beyond the plate 58 to form a flange 60 to which the angular extension 61 is secured by bolts and nuts, as indicated at 62. As can be seen from FIGS. 2 and 3, the upper end of each blade is affixed to the outer periphery of the ring 50 with the first leg of the angular member 57 adjacent the ring and the body of the blade projecting outwardly therefrom. At the lower end of each blade, the angular plate 57 intersects the circular plate 39 with the extension 61 projecting outwardly beyond the periphery thereof.

In operation, it is preferable that the rotor be turned at the rate of approximately three hundred revolutions per minute. With a rotor of about five feet in axial length and an average diameter of approximately six feet, this rate of rotation will require seventy-five to a hundred horsepower. When used in an orchard area, the top of the rotor should be positioned fifteen to twenty feet above ground to produce the most desirable draft pattern, and to assure an element of safety so that no one is likely to be be injured from contact with the moving components. Under present practices, fruit orchard trees are pruned so that they are approximately twenty feet high, which results in the rotor being placed so that the warm air is pulled downward through the open upper end of the rotor, and thrown out laterally into the fruit-bearing portions of the trees. One of these machines has been found capable of handling approximately ten acres of orchard, and it is preferable to place the machines at a low spot so that it will effectively clear out the coldest layers of air. Operation of the machine during conditions close to, or below freezing has been found to generate a temperature difference of seven to thirteen degrees with respect to areas not serviced by one of the machines. This differential will effectively prevent frost damage in most cases. It should be noted in passing that the operation of the machine should keep the rotor turning at a rate to avoid overheating of the tractor engine at the particular torque output required. It is preferable that the rotor should be balanced by the addition of weights (not shown) so that vibration is minimized. The stability of the unit can also be increased by the addition of diagonal guy wires extending from the upper portion of the mast to appropriate stakes spaced outward from the base of the machine.

The capacity of the machine can be selected to match the available power of the tractor by corresponding selection of the diameter of the rotor. As a very approximate rule of thumb, a diameter increase of one inch will increase the horsepower required (at the preferred rate of rotation) by twenty. It follows that the larger absorption of power will result in larger movement in the surrounding air mass.

I claim:

1. In a machine for inhibiting frost in a crop area, said machine including a mast, a vertical drive shaft rotatably mounted on said mast, drive means for said shaft, and a centrifugal fan rotor mounted at the upper end of said shaft, the improvement in said fan rotor comprising:
   a flat, circular plate having a peripheral stiffening flange;
   a hub mounted at the center of said plate and adapted to be detachably secured to said shaft;
   at least one circular ring of greater diameter than said plate, said ring being located above and in coaxial relation with said plate; and
   a plurality of blades, each blade having a first plate of angular cross sectional configuration with first and second legs, a second flat plate welded to said first plate to form a triangular cross sectional configuration with said second plate projecting beyond the end of said first leg of said first plate, and an angular extension affixed to the end of the second leg of said first plate and projecting in a direction generally opposite that of said flat plate, said blades being mounted to said ring and said circular plate at uniformly spaced intervals therearound with said first leg of said first plate being adjacent the outer periphery of said ring and said first plate intersecting said circular plate with said angular extension projecting beyond the periphery of said circular plate.

2. The improvement as defined in claim 1 further characterized in that the end of each blade at said ring leads the lower end of said blade at said circular plate.

* * * * *